(No Model.)

E. C. ATKINS.
SAW.

No. 266,006.          Patented Oct. 17, 1882.

WITNESSES.
Chas. N. Leonard.
Chas. L. Thurber.

INVENTOR.
Elias C. Atkins,
PER
C. Bradford
ATTORNEY

UNITED STATES PATENT OFFICE.

ELIAS C. ATKINS, OF INDIANAPOLIS, INDIANA.

SAW.

SPECIFICATION forming part of Letters Patent No. 266,006, dated October 17, 1882.

Application filed April 17, 1882. (No model.)

*To all whom it may concern:*

Be it known that I, ELIAS C. ATKINS, of the city of Indianapolis, county of Marion, and State of Indiana, have invented certain new and useful Improvements in Crosscut-Saws, of which the following is a specification.

The object of my said invention is to produce a crosscut-saw which shall cut more rapidly and with a less expenditure of strength than those whereon the teeth are formed and arranged in the ordinary manner.

It consists in the peculiar formation and arrangement of the several sets of teeth, whereby the aforementioned object is accomplished, as will be hereinafter specifically set forth.

I am aware that arranging the cutting-teeth in sets and providing a clearing-tooth between each set is old. I am also aware that filing the teeth so that each alternate set will cut in the opposite direction to the adjacent sets is old. I therefore desire to be understood as disclaiming all devices not hereinafter expressly described and claimed as new.

Figure 1:
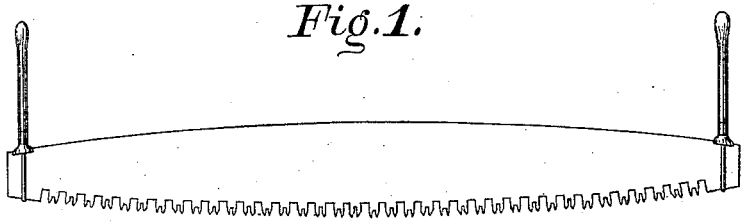
Figure 2:
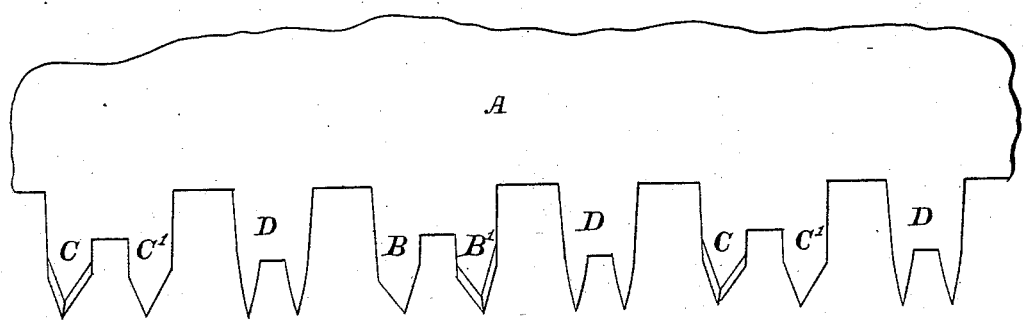
Figure 3:
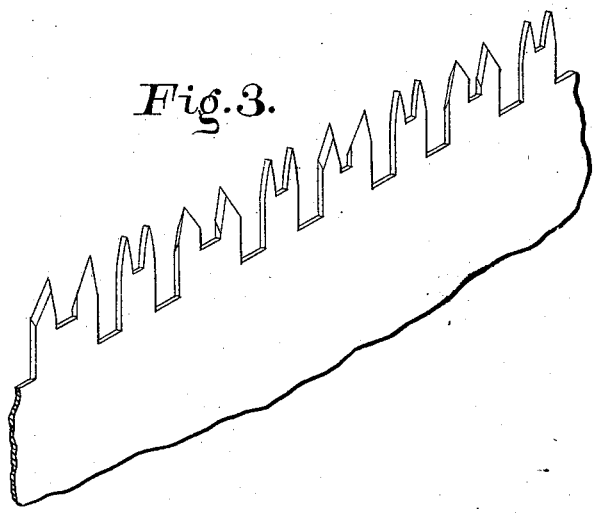

Referring to the accompanying drawings, which are made a part hereof, and on which similar letters of reference indicate similar parts, Figure 1 is a side view of a saw embodying my invention; Fig. 2, a detail view, on an enlarged scale, of a portion of the saw-plate and several teeth thereon, showing more exactly the form and arrangement of said teeth; and Fig. 3, a perspective view of substantially the same portion shown in Fig. 2 when turned teeth upward.

In said drawings, the portions marked A represent the body of the saw-blade, which is of the usual form; B B', the teeth of the sets which cut most when the saw is moving to the right; C C', the teeth which cut when the saw is moving to the left, and D the clearing-teeth.

In my present invention the distinctive features are as follows: Each of the clearing-teeth D, instead of being M-shaped, as is common, consists of two sharp projecting parts, each of which, if divided by a central vertical line, would consist of two halves alike in form and shape. This construction is superior to the M-shaped form in that both parts will assist to clear the kerf when the saw is moving in either direction, while only one part of the M-shaped tooth will so operate at a time. This is especially important in the form of saw shown, as when the cutting-teeth are arranged in sets, each alternate set cutting in one direction only, a larger amount of sawdust can be cut than can be successfully thrown out by the M-shaped clearers, and therefore this form of clearers, which does do this work, improves the saw very materially.

Another improvement in this saw consists in the manner of filing the teeth. As has before been stated, and as will readily be seen, the cutting-teeth are arranged in alternately-cutting sets. Heretofore in saws of this character the teeth have been filed in the same way that the old style of teeth were filed—that is, each alternate one beveled alike. In my invention that tooth of each set which is nearest to a clearing-tooth is beveled like the one upon the opposite side of the clearing-tooth. This arrangement allows the tooth which is actively in the cut to clear a direct path for the one which, by its shape, does little or no cutting, and the latter is thus enabled to pass through the log with a less expenditure of force. In other words, each tooth which is formed with a sharp or cutting bevel is followed by one having a sloping non-cutting bevel, and by my arrangement the latter is enabled to follow in the track of the former without being obliged to cut any portion of its own track.

These advantages, in combination with those of the alternately-cutting sets of teeth, make an exceedingly rapid cutting saw, and one which is therefore very superior.

Having thus fully described my said invention, what I claim as new, and desire to secure by Letters Patent, is—

A crosscut-saw having its cutting-teeth arranged in sets, with a clearing-tooth between each set, one set, B B', being sharpened in the form shown to cut in one direction, and the other, C C', being sharpened in like manner to cut in the other direction, and the clearing-tooth D, being composed of two parts, both parts being alike, and each part alike on both sides, all substantially as shown and described, and for the purposes specified.

In witness whereof I have hereunto set my hand and seal, at Indianapolis, Indiana, this 12th day of April, A. D. 1882.

ELIAS C. ATKINS. [L. S.]

In presence of—
C. BRADFORD,
JOHN H. RILEY.